Update no

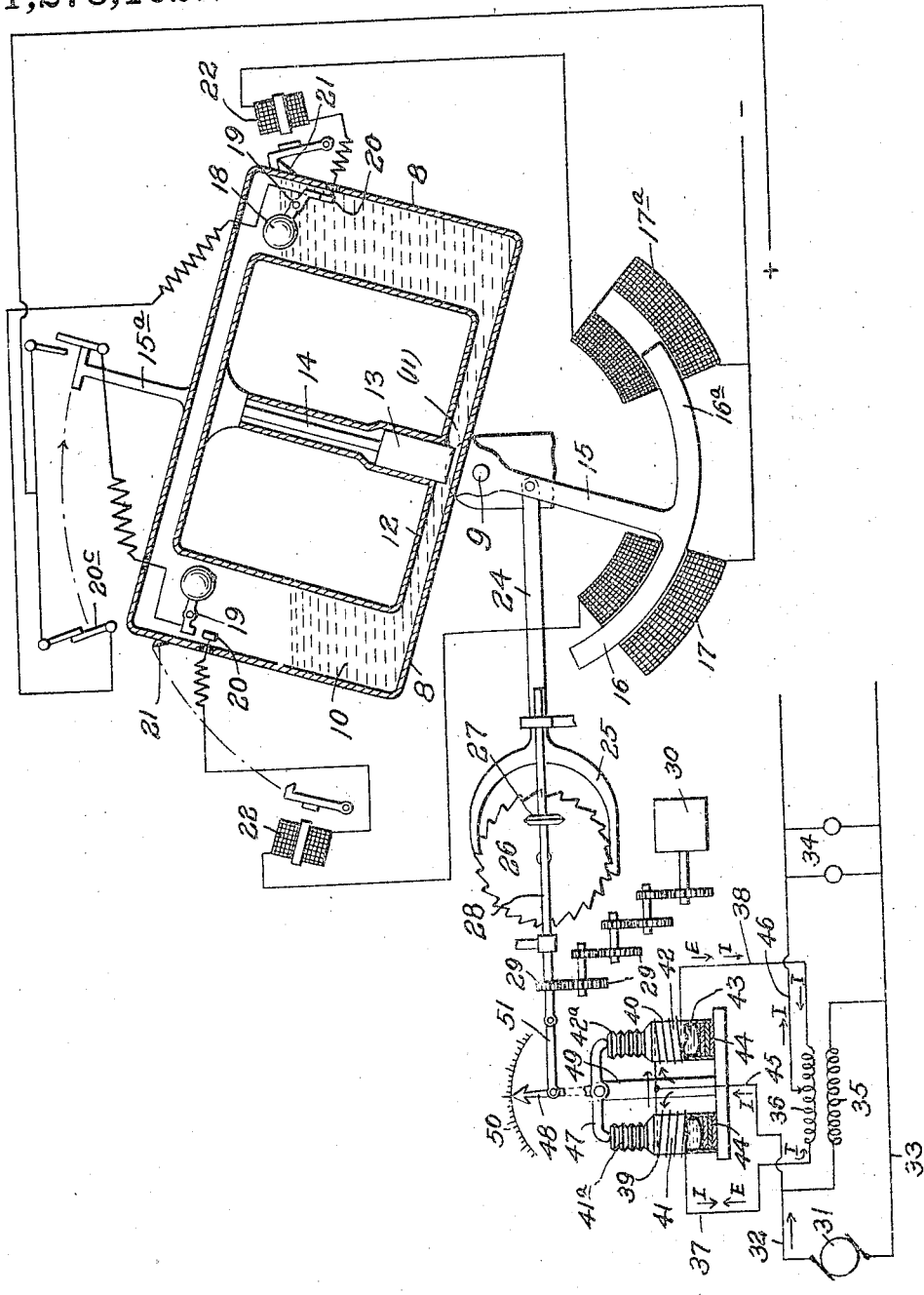

UNITED STATES PATENT OFFICE.

PAUL M. LINCOLN, OF PITTSBURGH, PENNSYLVANIA.

ELECTRIC RECORDING AND INTEGRATING DEVICE.

1,273,102.

Specification of Letters Patent.

Patented July 16, 1918.

Application filed July 27, 1915. Serial No. 42,176.

*To all whom it may concern:*

Be it known that I, PAUL M. LINCOLN, a citizen of the United States, residing at Pittsburgh, in the State of Pennsylvania, have invented certain new and useful Improvements in Electric Recording and Integrating Devices, of which the following is a specification.

My invention relates to means for periodically recording the indications of a slow-responding electric measuring device in order to get an integration of the quantity under measurement; more particularly it is a device for measuring exact time intervals in combination with an electric meter of the type set forth in Patent No. 1,156,412, granted to me October 12, 1915. One of the objects of my present invention is to provide a timing device for the purpose of coöperating with that kind of wattmeter which indicates what I have elsewhere called "the logarithmic average demand," as will appear hereafter. The invention is illustrated in the accompanying drawing, which is a diagram and partial section of the timing device, and of the slow responding wattmeter of my prior application, with its appropriate circuits.

Electric meters as most frequently made, have given an instantaneous or rapid response to changes in electrical conditions. With such devices a timing device used in connection with the indicator to secure integration has necessarily been a continuously indicating device, and must be so in order to obtain any degree of accuracy. In my prior Patent No. 1,156,412, I have set forth a wattmeter in which the actuating member of the indicator takes account of the full value of the quantity being measured only after the lapse of a certain predetermined time interval after the quantity has attained that value. That is, the device approaches its final indication in accordance with a logarithmic law, whereby the indication at any instant is not due to to the watts (or other quantity) passing at that instant, but is due to the "logarithmic average" of the watts (or other quantity) that have been passing for a certain predetermined time interval prior to the instant of observation. That is, the meter has an element whose position at any instant is an indication of the maximum demand at that instant, or, in other words, it is a slow responding wattmeter.

With such instrument it is not necessary to have a continuously indicating timing device in order to secure accurate integration, because the accuracy of the indication is not appreciably affected by a lapse of time between successive movements of the timing device so long as such time intervals are short in comparison with the interval required for the meter to make its response. On the other hand it is necessary that the timing device, when it does move, marks accurately the relatively long intervals between movements and does not vary in time by variations of temperature or from other causes; and it is also sufficient that its movement be made with relative suddenness, so as to take effect at a particular and definite time.

A form of clock employing the principle of a liquid flowing or trickling slowly through a small orifice, is a very ancient device, but as made heretofore it is inherently and grossly inaccurate, because any liquid varies in viscosity with a variation of temperature. In my device I eliminate this error by compensating for variations in viscosity.

For example, in the figure 1 I show a U-tube 8, mounted to rock on a pivot 9, and containing a liquid 10, which, as the containing vessel is rocked, must pass through a small orifice 11, formed between the sides of the connecting tube 12 and a plunger 13, supported at the free end of an expansible bar 14, which is rigidly supported at its upper end, so as to have a fixed relation to the U-tube. The material of the bar 14 is so chosen that with a rise of temperature, which decreases the viscosity of most liquids, the bar 14 will expand and make the orifice 11 smaller; this will compensate for the smaller viscosity of the liquid at such higher temperature, so that the rate of flow of the liquid through the orifice will be independent of the temperature of the liquid or the surrounding air. I may employ any convenient means for rocking the U-tube 8; for example, I here show an arm 15 rigidly attached to it below its pivot point 9, and carrying the plungers 16, 16ª, of solenoids 17 and 17ª. Inside the vessel 8, I provide at each side a float 18 pivoted at 19, and carrying an arm making electric contact with a fixed electrode 20, which is arranged in an electric circuit so as to excite the corresponding solenoid 17ª to tilt the vessel in the opposite direction, as soon as the liquid has risen high enough to raise the float 18 and make the contact 20. The U-tube then tilting to the left, the arm 15ª breaks the switch 20ᶜ. The operation will be apparent from the diagram. I also may use a catching lug 21 to hold the vessel in its tilted position until released by exciting the electro-magnet 22, when the electric circuit is closed.

The regulated motion of the U-tube 8 may be imparted to the recording or integrating mechanism in any convenient manner. As here shown, the actuating bar 15 is pivoted to a link 24 carrying the pawls 25 for turning a toothed ratchet wheel 26 in a well known manner; the rate of turning of the wheel 26 is thus constant. The wheel 26 may drive by friction a brush wheel 27, carried on a shaft 28, which in turn, by gearing 29, operates a continuous recorder 30; and the shaft 28 may be arranged to move in a direction radial to wheel 26 by an electric meter of the sort, illustrated in my prior application Serial No. 799,320, filed Nov. 5, 1913, for a watt meter. Pointers may also be attached to gears 29, if desired, and thus indicate at all times the integrated value of the quantity measured by the electric meter, in the usual and well recognized manner.

In this wattmeter, I arrange to obtain two derived circuits from the current in the line 32, 33, by which the source of power 31 feeds the load 34. I provide first a shunt coil 35 which forms the primary of a transformer, of which the secondary is 36. The voltage thus derived by induction causes a current proportional to the voltage in the line. The instantaneous direction of this current I have marked with small arrows and the letter E, and it will be seen that it flows by the leads 37 and 38 and coils 39 and 40 around the main bodies 41, 42 of two expansion chambers, which have upwardly extending portions 41ª, 42ª formed of nests of diaphragms, so as to be expansible, and filled with an expansible liquid 43. The heat generated in the coils 39, 40 will cause expansion of the liquid in these chambers, and the time lag between the passage of the current and its taking effect in such expansion I regulate by using more or less of the heat absorbing blocks or masses 44, 44.

By the lead 45, the two leads 37, 38, and lead 46, connected to the middle point of secondary coil 36, it will be seen that the line current (I) will pass through the coils 39, 40, not in series as did the voltage current (E), but in parallel, the instantaneous direction of which is shown by the small arrows marked I. The line current thus flowing may be reduced if desirable by the use of series transformers or shunts in the well known manner. Therefore one of the chambers (41) will be heated proportionally to the sum of the current due to voltage and the current due to amperage, and the other (40) will be heated by the difference between the current due to voltage and that due to amperage. This differential heating of the chambers (40) and (41) will obviously cause the rocker 47 and pointer or arm 48, pivoted on the brace 49 (made flexible to vertical motion), to rock in an angular direction, moving the pointer 48 along the scale 50. By any convenient connection (51) the shaft 28 therefore moves longitudinally by an amount governed in time by a logarithmic law, and in amount by the watts.

The movements of the arm 48 being imparted to the shaft 28, the result is the moving of brush wheel 27 fixed thereon to and from the center point of the disk gear 26. The initial location of the brush wheel 27 should be such that this wheel will stand at the center of the table 26 when the watts passing are zero. Now, when the timing device moves this disk 26, it is obvious that the train of gearing 29 in the recorder will be moved by an amount dependent upon the position of the brush wheel 27 on disk 26 at that instant. That is to say at specific and definitely marked intervals the recorder will be actuated by an amount dependent upon the logarithmic average demand of the wattmeter over the preceding interval of time; it will therefore integrate a series of logarithmic average demands taken at intervals which preferably have a known relation with the lag in the response of the wattmeter.

It will be of course understood that my invention is not limited to a particular construction of the time interval marker, except in so far as it marks distinct limiting intervals and has means for compensating for changes of temperature or avoiding the effects of temperature; nor is it dependent upon the construction of the electric meter, except that it shall be a slow-responding meter. In my application, Serial No. 859,775, filed Sept. 2, 1914, I have disclosed several other devices for obviating the effects of temperature in a timing device, and in that application have claimed the structure of the time marker itself, and do not claim the same herein.

Having thus described my invention and illustrated its use, what I claim is the following:

1. In a wattmeter, the combination with a slow-responding indicator, of a relatively quick-acting reciprocating motor the time interval between the reciprocations of which bears a definite relation to the time of response of the indicator, and an integrating device adapted to be actuated by the motor and controlled by the indicator.

2. In a wattmeter, the combination with a slow-responding indicator, of a definite time-interval measuring device the time between the operations of which bears a definite relation to the time of response of the indicator, and an integrating device adapted to be actuated by the time-measuring device and controlled by the indicator.

3. In a wattmeter, the combination with a slow-responding member, of a timing device adapted to operate at intervals having a predetermined relation to the time of response of the slow-responding member, and an integrating mechanism adapted to be actuated periodically by the timing device and controlled by the slow-responding member.

4. In a wattmeter, the combination with a slow-responding member, of a rotatable member, means for quickly turning the rotatable member at predetermined times, and an integrating mechanism adapted to be actuated by the rotatable member and to be controlled by the slow-responding member to indicate the integrated demand.

5. The combination with a wattmeter having a movable member adapted to respond a definite time interval after the occurrence of the current flow being measured, and means adapted to be actuated quickly at predetermined times, of an integrating device actuated by the quickly-actuated means and controlled by the movable member of the wattmeter to indicate the integrated demand.

6. In a wattmeter, the combination with a slow-responding indicator, of a relatively quick-acting reciprocating motor, the time interval between the reciprocations of which bears a predetermined relation to the time lag of the slow responding indicator, and an intergrating mechanism actuated only when the motor operates and adapted to be controlled by the indicator.

In testimony whereof I have hereunto signed my name.

PAUL M. LINCOLN.